(12) United States Patent  (10) Patent No.: US 7,192,046 B1
Quernemoen  (45) Date of Patent: Mar. 20, 2007

(54) PINTLE HITCH GUARD

(75) Inventor: Loren Quernemoen, 1224 Van Dyke Rd., Alexandria, MN (US) 56308

(73) Assignee: Loren Quernemoen, Alexandria, MN (US)

( * ) Notice: Subject to any disclaimer, the term of this patent is extended or adjusted under 35 U.S.C. 154(b) by 0 days.

(21) Appl. No.: 11/297,592

(22) Filed: Dec. 7, 2005

(51) Int. Cl.
B60D 1/04 (2006.01)
B60D 1/60 (2006.01)

(52) U.S. Cl. ...................... 280/507; 280/514
(58) Field of Classification Search ................. 280/507, 280/514
See application file for complete search history.

(56) References Cited

U.S. PATENT DOCUMENTS 3,823,962 A * 7/1974 Martin, Jr. .................. 280/514
4,379,569 A 4/1983 Koch
4,440,005 A * 4/1984 Bulle ............................. 70/14
4,492,386 A 1/1985 Roberts
4,989,892 A 2/1991 Kerins et al.
5,332,250 A 7/1994 Thorwall et al.
6,786,068 B2 * 9/2004 Spooner ......................... 70/14
6,862,904 B1 * 3/2005 Hubbart ......................... 70/14

* cited by examiner

Primary Examiner—Lesley D. Morris
Assistant Examiner—Marc A. Scharich
(74) Attorney, Agent, or Firm—Marsh Fischmann & Breyfogle LLP

(57) ABSTRACT

A pintle hitch guard for protecting a pintle hitch extending from a vehicle. The pintle hitch guard may include a base plate and a loop member fixedly interconnected to the base plate. The loop member may be sized to receive a hook or horn portion of a pintle hitch. The base plate is generally sized to cover the pintle hitch and protect the hitch form rearward impacts. In further arrangements, the hitch guard may also include side plates to protect the pintle hitch from side impacts.

18 Claims, 5 Drawing Sheets

PINTLE HITCH GUARD

FIELD OF THE INVENTION

The present invention relates to an apparatus for protecting a pintle hitch and associated method for protecting a pintle hitch.

BACKGROUND OF THE INVENTION

A pintle hitch, generally known as a pintle hook hitch, is a type of hitch utilized by various vehicles for connecting the rear (distal end) portion of a vehicle to a mating, front portion of a trailer or other object to be towed by the vehicle (a "trailer"). A pintle hitch generally includes two portions (e.g., a moveable arm portion and a fixed horn portion) adapted to lock together to interconnect with the mating portion of the trailer. The pintle hitch is generally mounted to the distal end of a vehicle such that at least a portion of the pintle hitch protrudes beyond the distal end of the vehicle.

As will be appreciated, when the pintle hitch is connected to a trailer, the trailer generally restricts other objects from physically interacting with the pintle hitch. Thus, when a trailer is attached to the pintle hitch, there is a relatively low likelihood that the pintle hitch will be inadvertently damaged by impact from another object. However, when the pintle hitch is not connected a trailer, it is possible for the pintle hitch to be damaged, such as by the interconnected vehicle inadvertently backing into an object or by another vehicle running into the pintle hitch.

A pintle hitch is generally fixedly interconnected to the vehicle by bolting or otherwise mounting the pintle hitch to the vehicle. Thus, it may be time consuming and inefficient to remove the pintle hitch during times when it is not in use.

Moreover, pintle hitches are often connected to vehicles that may be utilized for applications other than towing, such as heavy-duty vehicles including dump trucks, tractors as well as mining equipment. These heavy-duty vehicles are capable of pushing various objects as well as being pushed by other vehicles. In order to avoid damaging the interconnected pintle hitch, such vehicles are generally unable to push objects or be pushed using the end at which the pintle hitch is interconnected.

SUMMARY OF THE INVENTION

In view of the foregoing, one objective of the present invention is to provide an apparatus adapted to protect a pintle hitch from being damaged at times when a trailer is not interconnected to the pintle hitch. A related object is to provide an apparatus that protects the pintle hitch from being damaged via inadvertent side impacts, rear impacts and the like. Yet another related object is to provide an apparatus that is easily interconnectable to the pintle hitch to facilitate protecting the pintle hitch. Another object of the present invention is to provide an apparatus adapted to protect at least a portion of the pintle hitch such that the end of the vehicle interconnected to the pintle hitch may be utilized for pushing an object.

According to a first aspect of the present invention, a pintle hitch guard is provided. The hitch guard includes a base plate that defines a first surface and a loop member that is interconnected to the first surface. The loop member defines an aperture that is adapted to receive a portion of a pintle hitch. To facilitate connection to the pintle hitch, the loop member extends above the first surface. That is, the loop member defines a reference plane that is at least partially transverse to the first surface. Once connected to the pintle hitch, the base plate extends over at least a portion of the pintle hitch to protect the pintle hitch from undesired impact.

Various refinements exist of the features noted in relation to the subject aspect of the invention. Further features may also be incorporated into the subject aspect as well. These refinements and additional features may exist individually or in any combination. For instance, in one arrangement the base plate may comprise a U-shaped member where the loop member is interconnected to the inside surface of the U-shaped member. In such an arrangement, the hitch guard may provide protection to side and rearward surfaces of a pintle hitch. Such a U-shaped member may be formed from a curved plate. In such an arrangement, the length and width of the curved plate may be selected to provide desired coverage of side and/or rearward portions of a pintle hitch.

In another arrangement, the hitch guard includes first and second side plates that are fixedly interconnected to the base plate. Such side plates may define surfaces that are at least partially transverse to the first surface of the base plate. For instance, an included angle between the surface of each side plate and the first surface of the base plate may be between about 70° and about 150°. In such an arrangement, the base plate and side plates may all be planar members. Further, the base plate and side plates may be integrally formed or separate members that are fixedly interconnected.

The length of the side plates may be adjusted for a particular application. In one arrangement, the side plates may have the length that allows the side plates to extend from the base plate to or near a mounting surface where the pintle hitch is mounted to a vehicle. In this regard, the side plates may each have a length between about 4 inches and about 12 inches. However, it will be appreciated that other lengths are possible and within the scope of the present invention. By extending the side plates to or near the mounting surface, the base plate may be utilized as a push plate for use in pushing a vehicle having the hitch guard in place. Further, the side plates may include structure that allows for positioning the pintle hitch guard. For instance, one or both of the side plates may include apertures that form hand holds. Alternatively, loop members may be connected to the side plates to form a hand hold.

In an arrangement where the first and second side plates are utilized, the loop member may be disposed between the first and second plates. Further, the loop member may be spaced from a peripheral edge of the base plate and/or the side plates to permit clearance between a pintle hitch in the inside surfaces of the side plates. In such an arrangement, bracing may extend between the loop member and one or both of the side plates. In a further arrangement, the loop member may be positioned such that a reference axis that extends through the center of the aperture (i.e., normal to a plane defined by the aperture) does not intersect the side plates. As of the appreciated, this may allow for accessing the aperture from a direction above or below the loop member.

Numerous additional aspects, features and advantages of the present invention will become apparent to those skilled in the art upon consideration of the further description that follows.

DETAILED DESCRIPTION

Figure 1:
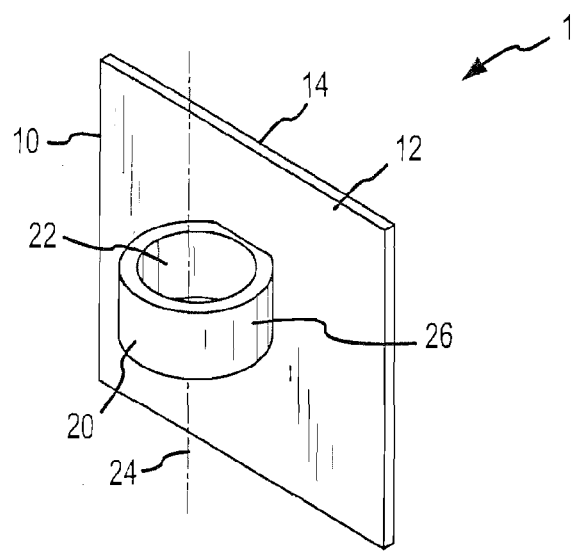
FIG. 1 is a perspective view of one embodiment of a pintle hitch guard of the present invention.
Figure 2:
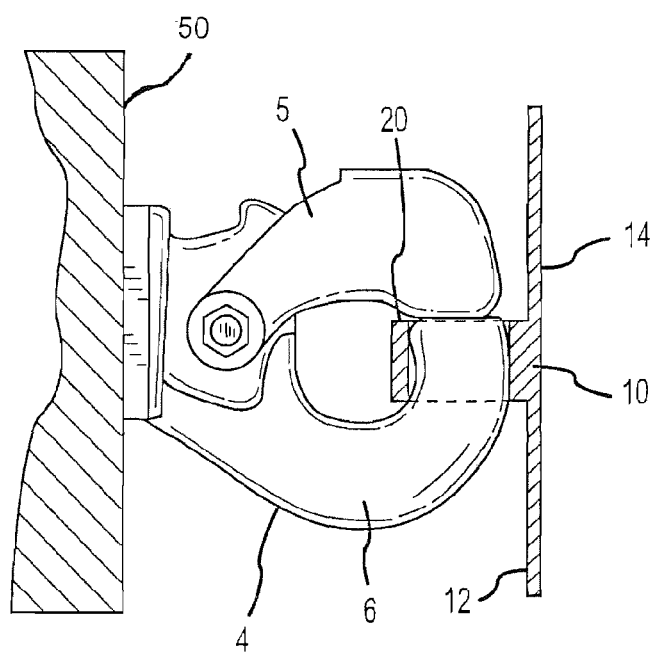
FIG. 2 is a side view of the pintle hitch guard of FIG. 1 interconnected to a pintle hitch.

Reference is now made to FIGS. 1 and 2, which illustrates a first embodiment of a pintle hitch guard 1 of the present invention. The pintle hitch guard 1 includes a base plate 10 and a loop member 20. The base plate 10 includes a first or inside surface 12 and a second or outside surface 14. The loop member 20 is fixedly interconnected to the inside surface 12 of the base plate 10 and at least partially defines an aperture 22 that is adapted to receive at least a portion of a pintle hitch 4 (e.g., a portion of an pintle hitch arm 5 and/or a portion of a pintle hitch horn 6. As shown, the aperture 22 of the loop member 20 defines a center reference axis 24 that is substantially aligned (e.g., parallel) with the inner surface 12 of the base plate 10. Stated otherwise, a reference plane defined by the aperture 22 is at least partially transverse to the base plate 10. As will be appreciated, this allows the pintle hitch arm 5 and/or horn 6 to be disposed through the aperture 22 substantially free of interference from the base plate 10.

The base plate 10 is generally a planar member to facilitate interconnection of the loop member 20 to the inside surface 12. As will be appreciated, the planar outside surface 14 of the base member 10 may allow the pintle hitch guard to be utilized as a push plate against which a pushing force may be applied. In order to more fully protect the pintle hitch from damage during such application of force, it may be desirable to size the loop member 20 to substantially fill the receiving aperture defined between the horn 6 and arm 5 of the pintle hitch 4 (not shown).

Figure 3:
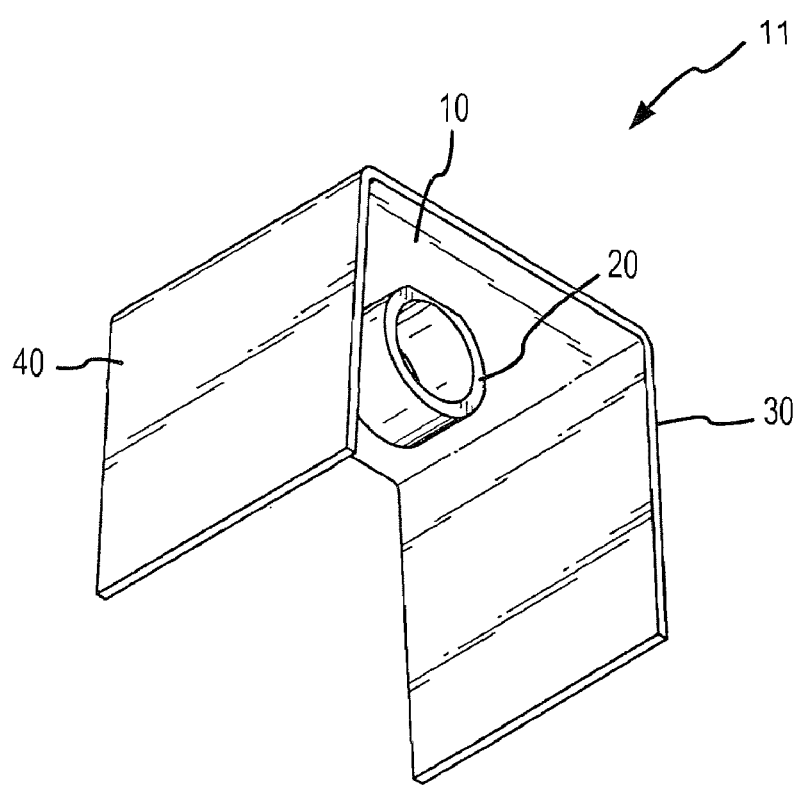
FIG. 3 is a perspective view of one embodiment of a pintle hitch guard including two side plates interconnected to a base plate.
Figure 4:
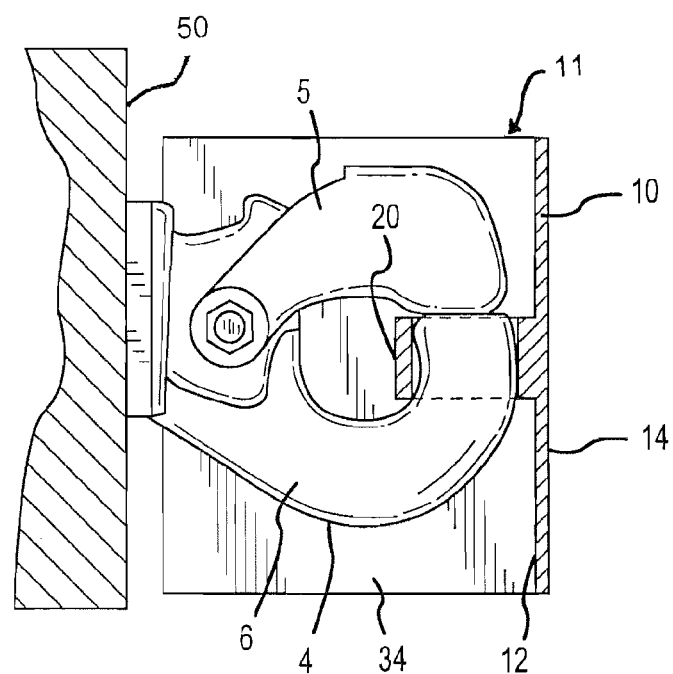
FIG. 4 is a side view of the pintle hitch guard of FIG. 3 interconnected to a pintle hitch, including a cut away portion to show the interconnection.
Figure 5:
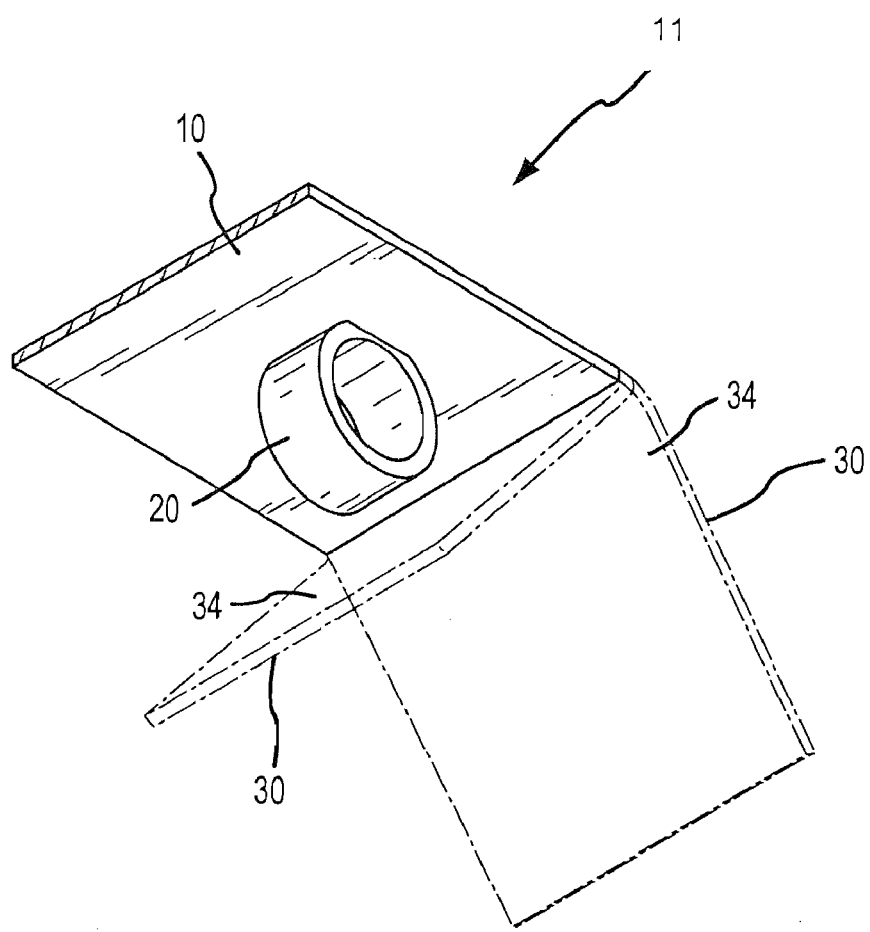
FIG. 5 is a perspective view of one embodiment of a pintle hitch guard including a side plate interconnected to a base plate at various angles.

To further protect the pintle hitch 4, it may be desirable to transfer forces applied to the base plate 10 to a vehicle, wherein such forces substantially bypass the pintle hitch 4. In this regard, a second embodiment of the pintle hitch guard 11 is illustrated in FIGS. 3–5. In FIG. 4, side plate 40 is removed for illustrative purposes. In the illustrated second embodiment, the pintle hitch guard 11 includes the above-described base plate 10 and loop member 20, but also includes a first side plate 30 and a second side plate 40 that are fixedly interconnected to opposing sides of the base plate 10. As shown, the inside surfaces of the side plates 30, 40 are at least partially transverse to the inner surface 12 of the base plate 10 and the loop member 20 is disposed between the side plates 30, 40. The side plates 30 and 40 are oriented in relation to the loop member 20 such that the side plates 30, 40 do not intersect the center reference axis 24 defined by the loop member 20. Thus, the side plates 30, 40 may protect the sides of the pintle hitch 4 from impact while still allowing access to the loop member 20. As shown, the base plate 10, first side plate 30 and second side plate 40 form a generally U-shaped hitch guard 11 having an inner surface and an outer surface. In this embodiment, the loop member 20 may be fixedly interconnected to the inner surface of the U-shaped hitch guard 11.

As shown in FIGS. 3 and 4, when the hitch guard 11 is interconnected to a pintle hitch 4, the side plates 30, 40 extend from the base plate 10 towards a mounting surface 50 of, for example, a vehicle's bumper or frame. Preferably, the side plates 30, 40 extend near or to the mounting surface 50. In this regard, the side plates 30, 40 may be utilized to maintain the angular position of the pintle hitch guard 11 relative to the pintle hitch 4. That is, the side plates 30, 40 may prevent the loop member 20 of the hitch guard 11 from rotating more than a few degrees when disposed within the aperture formed by the arm 5 and horn 6 of the pintle hitch 4. This may also allow for maintaining the outside surface 14 of the base plate 10 in a substantially vertical orientation when the hitch guard 11 is connected to a pintle hitch 4. Such a vertical orientation of the outside surface 14 of the base plate 10 may facilitate use of the hitch guard 11 as a push plate.

Importantly, the side plates 30, 40 may transmit forces applied to the outside surface of the hitch guard 11 to the mounting surface 50 of the vehicle. That is, when the hitch guard 11 is utilized as a push plate or otherwise impacted, the distal ends of the first and second plates 30, 40 may engage the mounting surface 50 of the vehicle and thereby carry forces from an impact site to the vehicle without transmitting forces through the pintle hitch 4. Accordingly, damage to the pintle 4 hitch may be avoided.

The base plate 10 and side plates 30, 40 may be fixedly interconnected in a variety of manners. For example, the base plate 10 and side plates 30, 40 may be separate members that are fixedly interconnected along their mating surfaces/common edges (e.g., such as by welding). Alternatively, the base plate 10 and side plates 30, 40 may be integrally formed. For example, a single sheet of metal may be bent to define the base plate 10 and side plates 30, 40. As may be appreciated, a single sheet of metal could also be formed into a curved plate to define a generally U-shaped hitch guard.

The base plate 10 and side plates 30, 40 may also be oriented in a variety of manners. For example, the base plate 10 and side plates 30, 40 may be orthogonally oriented, as illustrated in FIG. 3. In this arrangement, the first and second side plates 30, 40 extend away from the base plate 10 and are substantially parallel to one another. However, the base plate 10 and side plates 30, 40 may also be non-orthogonally oriented. For example, the side plates 30, 40 may be interconnected to the base plate 10 such that surfaces of the side plates 30, 40 are disposed at a non-orthogonal angle to the inside surface 12 of the base plate 10. For instance, the included angle between the inner surface 12 of the base plate 10 and an inner surface 34 of side plates 30 may be in a range from about 70° to 150°, more often in a range from 90° to 135°. See FIG. 5.

The base plate 10 and, when utilized, side plates 30, 40 are generally formed from a durable non-pliable material such as steel or other metallic materials. Other materials may be utilized as well including, without limitation, polymeric and/or composite materials. What is important is that the material selected to form the hitch guard 1, 11 adequately protects the pintle hitch 4 from impacts damage and/or has sufficiently strength to be utilized as a push plate. Accordingly, the thickness of the plates 10, 30 and 40 may be selected in accordance with desired mechanical properties.

The base plate 10 is sized to substantially to cover a distal portion of the pintle hitch 4. See FIGS. 1 and 3. For example, the base plate 10 may be generally rectangular and have a width of between about six inches and about twelve inches and a height of between about six inches and about twelve inches. As may be appreciated, although a rectangular shape has been described, the base plate 10 may be formed of any shape that adequately covers the distal end of the pintle hitch. Likewise, the size of the side plates 30, 40 may be selected to substantially cover the sides of the pintle hitch 4. Further, and as noted above, the length of the side plates 30, 40 may be selected such that the ends of the side plates 30, 40 extend to a mounting surface of the pintle hitch. In this regard, the length of the side plates may be between about four inches and about twelve inches. However, it will be appreciated that depending on the desired application of the hitch guard, the dimensions may be different from those specified above. For instance, in mining applications the dimensions of the hitch guard may be substantially larger than those above.

The loop member 20 is also generally formed from a durable non-pliable material such as steel or other metallic material. The loop member 20 may be a non-continuous member that has first and second ends fixedly connected to the inner surface 12 of the base plate 10. In such an embodiment, the loop member 20 may define a first portion of an aperture 22 and the inner surface 12 of the base plate 10 may define a second portion (e.g., the remaining portion) of the aperture 22. However, in the illustrated embodiment, the loop member 20 is a ring member having an outer surface 26 fixedly interconnected (e.g., welded) to the inner surface 12 of the base plate 10. As may be appreciated, in this embodiment the ring member fully defines the aperture 22.

The aperture 22 should be of sufficient size such that it capable of receiving a portion of a pintle hitch 4 (e.g., an arm 5 or horn 6 portion) to interconnect therewith. For example, the aperture may comprise a diameter of from about two inches to about four inches. Selection of the exact size of the aperture is a matter of design choice an may depend on one or more dimensions of a particular pintle hitch to which the pintle hitch guard will be connected. As may be appreciated, the aperture 22 may be a generally circular shape as illustrated, or be formed in any other non-circular that is adapted to receive a portion of the pintle hitch.

As noted, the loop member 20 generally defines a center reference axis 24 that extends through the center of the aperture 22. In one embodiment, the inner surface 12 of the base plate 10 is a substantially planar surface and the center reference axis 24 is parallel to the inner surface 12. As may be appreciated, by locating the center reference axis 24 substantially parallel to the first surface 12, the loop member 20 is oriented to the base plate 10 such that the aperture 22 can interconnected with the pintle hitch 4 free of interference from the base plate 10. Further, the loop member 20 may be disposed in spaced relation to the perimeter of the base plate 10 such that the loop member is spaced from the side plates to allow for clearance therebetween. In this regard, the minimum spacing between the an interconnection point of the loop member 20 and a peripheral edge of the base plate 10 is generally from about two inches to about five inches.

Referring now to FIG. 4, interconnection of the pintle hitch guard 1 to a pintle hitch 4 is described. First, the pintle hitch 4 generally may be positioned such that the arm 5 is separated from the hook 6 at their distal ends (not shown). That is, the arm 5 may be moved to an open position. The aperture 22 of the loop member 20 may then be positioned over the horn 6 of the pintle hitch 4. Next, the arm of the pintle hitch may be moved to engage the horn 6 (i.e., moved to a closed position), thereby restrainably interconnecting the pintle hitch guard 1 to the pintle hitch 4. As may be appreciated, after the arm 5 and horn 6 of the pintle hitch 4 have been interconnected at their distal end, the base plate 10 may be disposed in a position adjacent the pintle hitch 4 to cover at least a distal portion of pintle hitch 4, and the side plates 30, 40 may be positioned adjacent to the side surfaces of the pintle hitch 4.

As noted above and with reference to FIG. 1, the loop member 20 may include an aperture 22, which is defined by an inner surface of the loop member 20. As will be appreciated, an inner surface of the loop member 20 may be any size and shape that defines an aperture 22 that facilitates interconnection of the pintle hitch guard 1 to the pintle hitch 4 via the loop member 20. For example, an inner surface of the loop member 20 may be substantially in the shape of a cylinder, cone, tetrahedron, prism, donut or otherwise to facilitate the interconnection between the pintle hitch guard 1 and the pintle hitch 4.

As noted above, the pintle hitch guard 1 may also be used to push an object. In this regard, the present invention contemplates a method for pushing an object using a pintle hitch guard 1, the method including the steps of interconnecting a pintle hitch to a vehicle, interconnecting the pintle hitch guard 1 to the pintle hitch, as interconnected a portion of the pintle hitch guard 1 (e.g., the base plate 10) covers a distal portion of the pintle hitch, and pushing an object with the vehicle via a portion of the pintle hitch guard (e.g., the base plate 10).

Figure 6:
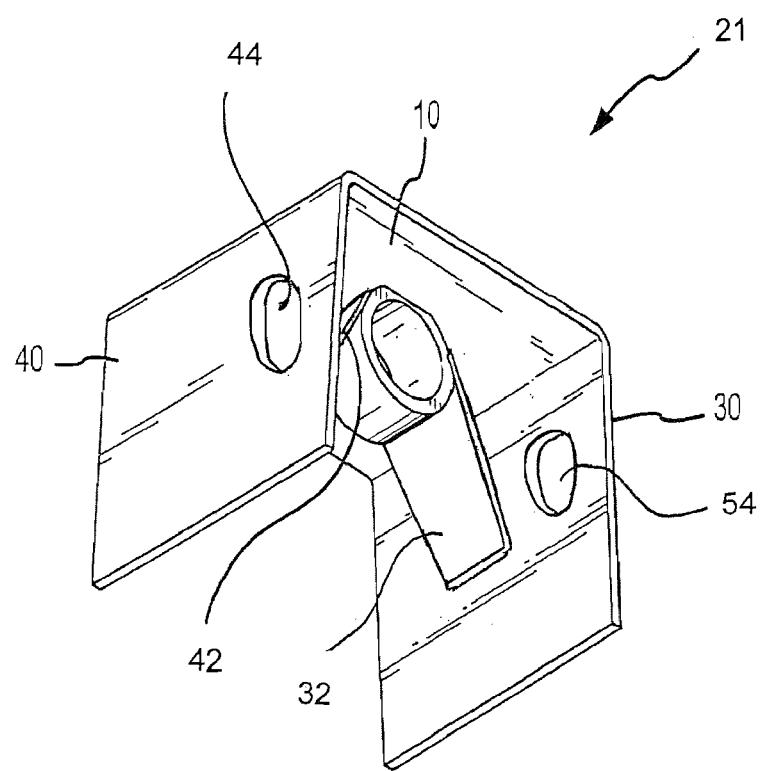
FIG. 6 is a perspective view of an alternate embodiment of the pintle hitch guard of FIG. 3.

FIG. 6, illustrates a third embodiment of the pintle hitch guard 21 that is substantially similar to the pintle hitch guard 11 of FIG. 3. However, the pintle hitch guard 21 of the third embodiment further includes first and second braces 32, 42 that extend from the loop member 20 to each side plate 30, 40, respectively. The braces 32, 42 provide additional support for the loop member 20 and increase the overall rigidity of the hitch guard 21. As will be appreciated, the braces 32, 42 may be made of the same or similar material as the remainder of the hitch guard 21 and may be interconnected thereto in any appropriate manner.

The third embodiment of the hitch guard 21 also includes first and second apertures 54, 44 that extend through the side plates 30, 40, respectively. These apertures 54, 44 provide a hand hold for use in positioning the hitch guard 21 relative to a pintle hitch and/or removing the hitch guard from a pintle hitch. As will be appreciated, loop members (not shown) could alternatively be interconnected to the side plates 30, 40 to provide hand holds.

The embodiments described above are for exemplary purposes only and is not intended to limit the scope of the present invention. Various adaptations, modifications and extensions of the described apparatus/method will be apparent to those skilled in the art and are intended to be within the scope of the invention as defined by the claims that follow.

What is claimed:

1. A pintle hitch guard for connection to a pintle hitch, said guard comprising: a base plate having a first surface; a first side plate fixedly interconnected to said base plate, wherein a surface of said first side plate is at least partially transverse to said first surface of said base plate; a second side plate fixedly interconnected to said base plate, wherein a surface of said second side plate is at least partially transverse to said first surface of said base plate; and a loop member fixedly interconnected to said first surface of said base plate, wherein said loop member at least partially defines an aperture that is adapted to receive at least a first portion of a pintle hitch, wherein said aperture of said loop member defines a reference plane that is at least partially transverse to said first surface of said base plate.

2. The pintle hitch guard of claim 1, wherein said loop member is disposed between said first and second side plates on said first surface of said base plate.

3. The pintle hitch guard of claim 2, further comprising: at least one brace extending between said loop member and at least one of said first and second side plates.

4. The pintle hitch guard of claim 1, wherein said base plate and said first and second side plates are integrally formed.

5. The pintle hitch guard of claim 1, wherein said first side plate and said second side plate extend from said base plate in substantially the same direction.

6. The pintle hitch guard of claim 1, wherein a center reference axis defined by said aperture of said loop member does not intersect said first and second side plates.

7. The pintle hitch guard of claim 1, wherein each of said first and second side plates define a side plate surface, and wherein an included angle between each of said side plate surfaces and said first surface of said base plate is between about 70° and 150°.

8. The pintle hitch guard of claim 1, wherein at least one of said first and second side plates further comprises: an aperture extending through a surface of said side plate.

9. The pintle hitch guard of claim 1, wherein said base plate comprises a substantially planar member.

10. The pintle hitch guard of claim 1, wherein said base plate is curved to define a substantially U-shaped member, wherein said first surface is an inside surface of said U-shaped member.

11. The pintle hitch guard of claim 1, wherein said loop member comprises a ring member fully defining said aperture and having an outer surface, wherein a portion of said outer surface is fixedly interconnected to said first surface.

12. The pintle hitch guard of claim 1, wherein said loop member is disposed in a spaced relationship to a peripheral edge of said base plate.

13. A pintle hitch guard comprising: a U-shaped member having an outside surface and an inside surface; a loop member fixedly interconnected to said inside surface of said U-shaped member, wherein said loop member at least partially defines an aperture that protrudes from said inside surface, wherein said aperture is adapted to receive at least a first portion of a pintle hitch.

14. The pintle hitch guard of claim 13, wherein said U-shaped member comprises a center base plate and two side plates.

15. The pintle hitch guard of claim 14, wherein said center base plate and said two side plates are integrally formed.

16. The pintle hitch guard of claim 13, wherein said loop member defines a center reference axis, wherein said center axis does not intersect said U-shaped member.

17. The pintle hitch guard of claim 13, further comprising:
a brace member extending between said loop member and said U-shaped member.

18. A method for protecting a pintle hitch comprising:
aligning a loop member of a pintle hitch guard with a first portion of a pintle hitch attached to a vehicle, wherein said loop member is fixedly interconnected to a plate member; and interconnecting a second portion of a pintle hitch to said first portion of said pintle hitch, wherein said pintle hitch guard is supportably connected to said pintle hitch, and wherein said plate member is disposed adjacent said pintle hitch and covers at least a first surface of said pintle hitch.

* * * * *